(12) United States Patent
Suzuki

(10) Patent No.: US 10,194,039 B2
(45) Date of Patent: Jan. 29, 2019

(54) PRINTING RESULT ESTIMATION APPARATUS AND COMPUTER PROGRAM

(71) Applicants: KABUSHIKI KAISHA TOSHIBA, Tokyo (JP); TOSHIBA TEC KABUSHIKI KAISHA, Tokyo (JP)

(72) Inventor: Tatsuya Suzuki, Ito Shizuoka (JP)

(73) Assignees: Kabushiki Kaisha Toshiba, Tokyo (JP); Toshiba TEC Kabushiki Kaisha, Tokyo (JP)

( * ) Notice: Subject to any disclaimer, the term of this patent is extended or adjusted under 35 U.S.C. 154(b) by 17 days.

(21) Appl. No.: 15/249,878

(22) Filed: Aug. 29, 2016

(65) Prior Publication Data

US 2017/0111525 A1 Apr. 20, 2017

(30) Foreign Application Priority Data

Oct. 15, 2015 (JP) .................................. 2015-203676

(51) Int. Cl.
*H04N 1/00* (2006.01)
*G06F 3/12* (2006.01)

(52) U.S. Cl.
CPC ......... *H04N 1/0044* (2013.01); *G06F 3/1218* (2013.01); *G06F 3/1229* (2013.01); *G06F 3/1237* (2013.01); *G06F 3/1253* (2013.01); *G06F 3/1285* (2013.01); *H04N 1/00204* (2013.01); *H04N 1/00344* (2013.01); *H04N 1/00466* (2013.01); *H04N 1/00482* (2013.01);
(Continued)

(58) Field of Classification Search
CPC ............. H04N 1/0044; H04N 1/00344; H04N 1/00204; H04N 1/00482; H04N 1/00466; H04N 2201/0039; H04N 2201/0094
See application file for complete search history.

(56) References Cited

U.S. PATENT DOCUMENTS 6,734,985 B1 * 5/2004 Ochiai .................. G06F 3/1285
  358/1.14
7,161,696 B2  1/2007 Yamamoto et al.
(Continued)

FOREIGN PATENT DOCUMENTS

JP  2003-345558  12/2003
JP  2008-192070  8/2008
(Continued)

OTHER PUBLICATIONS

Extended European Search Report dated Feb. 16, 2017, filed in counterpart European Patent Application No. 16189314.4 (8 pages).

*Primary Examiner* — Ming Y Hon
(74) *Attorney, Agent, or Firm* — Patterson & Sheridan, LLP

(57) ABSTRACT

A printing result estimation apparatus includes a print condition obtaining unit configured to obtain condition information indicating a print condition set by a user, a print result estimation unit configured to estimate an execution result of the printing process based on the condition information, wherein the print result estimation unit estimates the result of the printing process based on print effect data on cost factors, environmental factors, and a time required to print, and a display device operatively connected to the print result estimation apparatus, wherein the display device is configured to display a print result estimate of the print estimation unit.

8 Claims, 9 Drawing Sheets

(52) U.S. Cl.
CPC ............... *G06F 2206/1504* (2013.01); *H04N 2201/0039* (2013.01); *H04N 2201/0094* (2013.01)

(56) References Cited

U.S. PATENT DOCUMENTS

| | | | |
|---|---|---|---|
| 8,027,047 B2 | 9/2011 | Nakagawa | |
| 2002/0054313 A1* | 5/2002 | Shimizu | G06F 3/1229 358/1.13 |
| 2004/0215759 A1* | 10/2004 | Takahashi | H04L 63/10 709/223 |
| 2005/0213115 A1* | 9/2005 | Johnson | G06F 3/1207 358/1.1 |
| 2005/0270566 A1* | 12/2005 | Tanaka | G06F 3/1204 358/1.15 |
| 2006/0250631 A1* | 11/2006 | Igarashi | G06F 3/1219 358/1.13 |
| 2007/0024880 A1* | 2/2007 | Sato | H04N 1/54 358/1.9 |
| 2009/0195821 A1* | 8/2009 | Matoba | H04N 1/0032 358/1.15 |
| 2010/0053673 A1* | 3/2010 | Oba | G03G 21/02 358/1.15 |
| 2010/0123925 A1* | 5/2010 | Tomaru | G06F 3/1256 358/1.15 |
| 2011/0007359 A1* | 1/2011 | Yamakawa | G03G 15/502 358/1.15 |
| 2011/0069325 A1* | 3/2011 | Kawashima | G06F 3/1219 358/1.1 |
| 2011/0116108 A1 | 5/2011 | Ha et al. | |
| 2011/0267647 A1* | 11/2011 | Kamasuka | G06F 3/1203 358/1.15 |
| 2012/0268785 A1* | 10/2012 | Okada | H04N 1/00244 358/1.15 |
| 2013/0107301 A1* | 5/2013 | Takagi | G06K 15/02 358/1.13 |
| 2014/0063514 A1* | 3/2014 | Roy | G06Q 10/10 358/1.9 |
| 2014/0198341 A1* | 7/2014 | Nakayama | G06F 3/1222 358/1.15 |
| 2015/0036177 A1* | 2/2015 | Naruse | H04N 1/00307 358/1.15 |
| 2015/0172476 A1* | 6/2015 | Itogawa | H04N 1/00068 358/1.15 |
| 2015/0220815 A1 | 8/2015 | Akiyama | |
| 2016/0080584 A1* | 3/2016 | Itogawa | H04N 1/00068 358/1.15 |
| 2016/0165091 A1* | 6/2016 | Ooba | H04N 1/32561 358/1.15 |
| 2016/0366289 A1* | 12/2016 | Kitamura | H04N 1/00103 |

FOREIGN PATENT DOCUMENTS

| | | |
|---|---|---|
| JP | 2010-033600 | 2/2010 |
| JP | 2011-070700 | 4/2011 |

* cited by examiner

110
- GENERAL | IMAGE QUALITY | EFFECT | CUSTOM | TEMPLATE
- ORIGINAL SIZE: A4 (210×297mm) ▶
- PRINT SHEET SIZE: SAME AS ORIGINAL SIZE ▶
- ☐ ENLARGE/REDUCE:
- 100 ◀▶ % (25–400)
- COLOR: AUTOMATICALLY SELECT ▶
- SELECT COLOR...
- ORIENTATION OF SHEET: ⦿ PORTRAIT ○ LANDSCAPE
- NUMBER OF COPIES: 1 ◀▶ (1–999)
- STAPLE:
- HOLE PUNCH:

120
- [PRINTING COST ] AAA [JPY ]
- [PRINTING TIME ] BBB [SECONDS]
- [ENVIRONMENTAL INFLUENCE ] CCC

FIG. 7

| TYPE OF PRINT RESULT | CORRESPONDING ELEMENT | | | | | | | | | | |
|---|---|---|---|---|---|---|---|---|---|---|---|
| | DESIGNATION OF PRINTING COLOR | DESIGNATION OF PRINTING SURFACE | DESIGNATION OF AGGREGATE PRINTING | DESIGNATION OF NUMBER OF COPIES | DESIGNATION OF HOLE PUNCHING | DESIGNATION OF STAPLING | DESIGNATION OF SHEET DISCHARGING DESTINATION | DESIGNATION OF SHEET TYPE | POWER CONSUMPTION | PRINTING SPEED | STATUS OF IMAGE FORMING APPARATUS |
| PRINTING COST | ○ | ○ | ○ | ○ | | | | | | | |
| PRINTING TIME | ○ | ○ | ○ | ○ | ○ | ○ | ○ | ○ | | ○ | ○ |
| DEGREE OF ENVIRONMENTAL INFLUENCE | ○ | ○ | ○ | ○ | | | | ○ | ○ | | |

PRINTING RESULT ESTIMATION APPARATUS AND COMPUTER PROGRAM

CROSS-REFERENCE TO RELATED APPLICATION

This application is based upon and claims the benefit of priority from Japanese Patent Application No. 2015-203676, filed Oct. 15, 2015, the entire contents of which are incorporated herein by reference.

FIELD

Embodiments described herein relate generally to a printing result estimation apparatus and a computer program.

BACKGROUND

In the related art, it is possible to perform printing via a network, from a terminal such as a personal computer (PC) through communication with an image forming apparatus such as a printer or a multifunction printer. In general, a user of the PC can designate various print conditions from a setting screen provided by a drive which is installed in the PC. For example, the user can designate conditions such as the discharging destination of a printed sheet, a print color, or the number of copies of a document to be printed.

With an increase in environmental awareness and an increase in demand for reduction of cost, the user's need to confirm a print result in advance is increased. When the user can check the print result in advance, after the users check the cost or the environmental influence of the printing to be executed, the user can determine whether or not to execute the printing. However, in a printing method of the related art, it is not easy to confirm the printing result in accordance with a print condition or a status of a printing apparatus in advance.

DESCRIPTION OF THE DRAWINGS

FIG. 6 is a view showing a specific example of a status screen display on which print conditions and print results are displayed on a display unit.

FIG. 7 is a chart showing an example of information to be used for estimating the print result.

DETAILED DESCRIPTION

According to embodiment, there is provided a printing result estimation apparatus and a computer program which are capable of providing a print result in accordance with a print condition and a state of the print apparatus prior to executing printing.

In general, according to one embodiment, a printing result estimation apparatus includes a print condition obtaining unit configured to obtain condition information indicating a print condition set by a user, a print result estimation unit configured to estimate an execution result of the printing process based on the condition information, wherein the print result estimation unit estimates the result of the printing process based on print effect data on cost factors, environmental factors, and a time required to print, and a display device operatively connected to the print result estimation apparatus, wherein the display device is configured to display a print result estimate of the print estimation unit.

Hereinafter, a printing result estimation apparatus and a computer program according to an embodiment will be described in detail.

Figure 1:
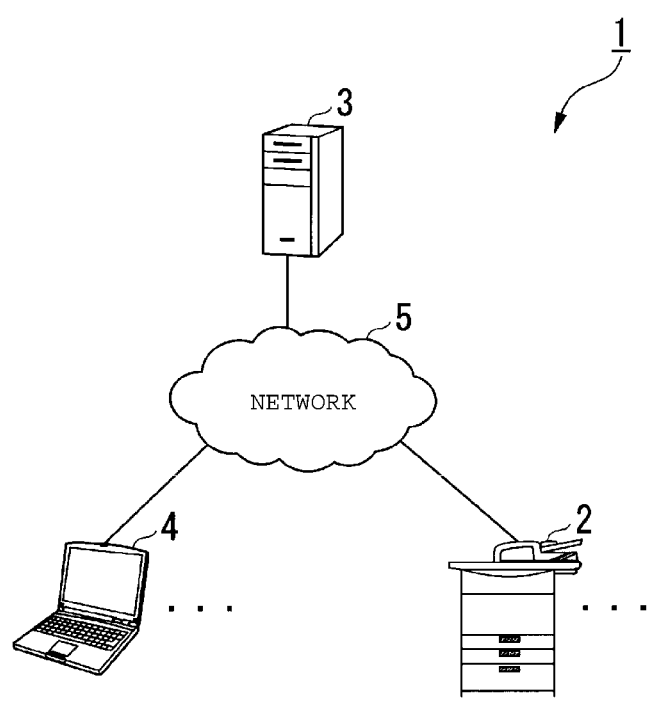
FIG. 1 is a view schematically showing a system configuration of a printing system including a printing result estimation apparatus according to an embodiment.

FIG. 1 is a view schematically showing a system configuration of a printing system 1 including a printing result estimation apparatus according to the embodiment. The printing system 1 includes an image forming apparatus 2, a print server 3, and a user terminal 4. The image forming apparatus 2, the print server 3 and the user terminal 4 can communicate with each other via a network 5. The image forming apparatus 2 has a function of printing information, indicated by print data, on a sheet. For example, the image forming apparatus 2 is a multifunction peripheral (MFP), a printer, or the like. The print data is transmitted from the print server 3 or the user terminal 4. The print data may be text data or image data. The printing system 1 includes one or more of the image forming apparatuses 2.

The print server 3 is a device which uses a function of the image forming apparatus managed by the print server 3 in the other apparatus on the network. The print server 3 transmits the print data transmitted from the user terminal 4 to the image forming apparatus 2 selected by the user.

The user terminal 4 is a terminal device which allows the user of the printing system 1 to use the functions of the image forming apparatus 2 or the print server 3. For example, the user terminal 4 is a terminal device such as a PC or a smartphone. A print program for using the image forming apparatus 2 or the print server 3 is installed in the user terminal 4 in advance. In general, the print program is provided to the user as a driver to allow interfacing with the image forming apparatus 2. The user can use the functions of the image forming apparatus 2 or the print server 3 from the user terminal 4 by installing the driver. The user terminal 4 executes the print program to provide an input interface of the print condition to the user. The user terminal 4 transmits the print data and the condition information indicating the print condition, as instructions to cause the execution of the printing process, to the image forming apparatus 2 or print server 3.

The user terminal 4 of the embodiment serves as a print result estimation apparatus which estimates the print result related to the printing in the print condition designated by the execution of the print program. Specifically, the user terminal 4 estimates the print result based on the print condition input by the user, or a status of the image forming apparatus 2, in executing the printing process.

Figure 2:
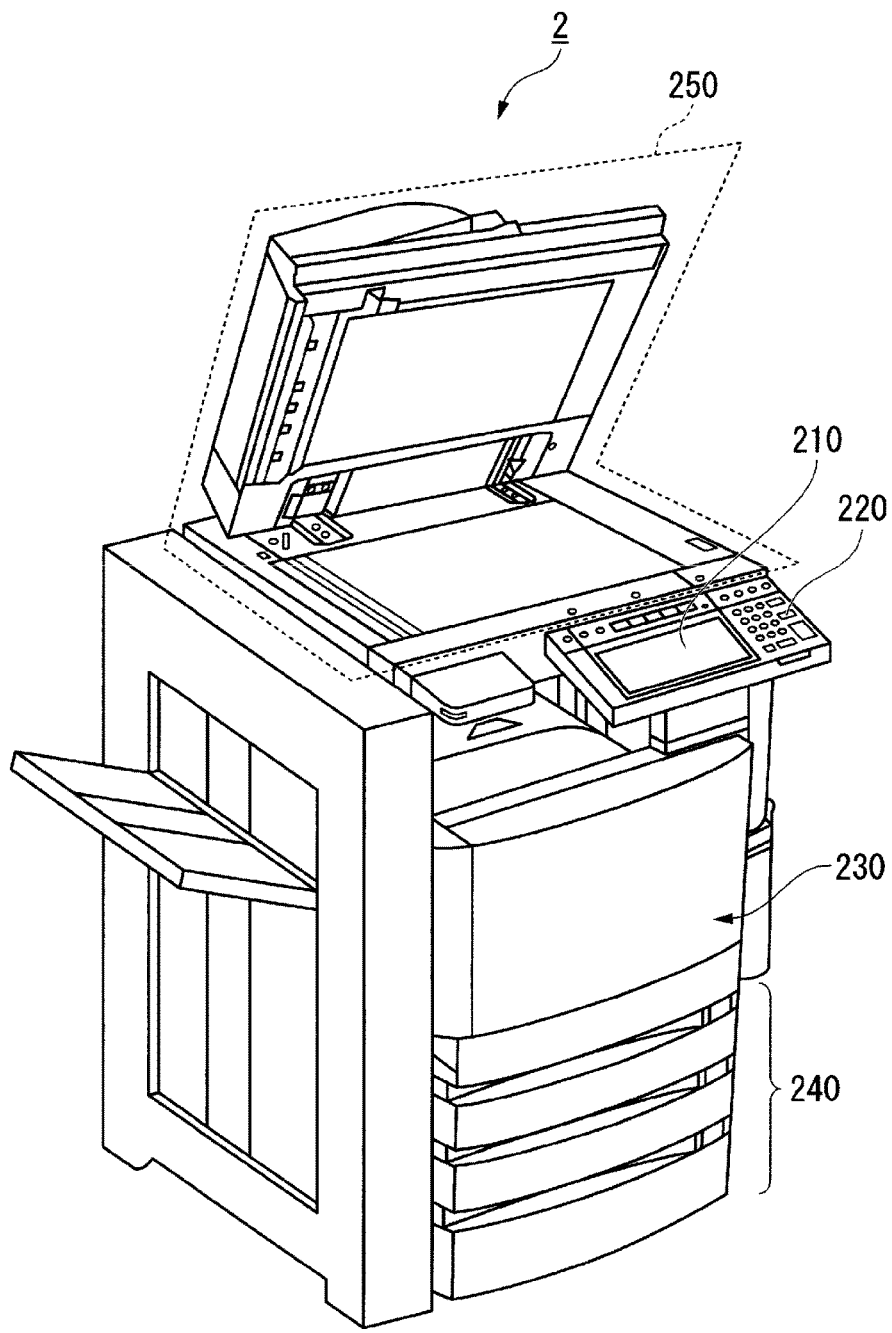
FIG. 2 is a view showing an appearance of an overall configuration of an image forming apparatus according to the embodiment.

FIG. 2 is a view showing the appearance of an overall configuration of an image forming apparatus 2 according to the embodiment. For example, the image forming apparatus 2 is a multifunction printer. The image forming apparatus 2 includes a display 210, a control panel 220, a printer unit 230, a sheet storage unit 240, and an image reading unit 250. The printer unit 230 of the image forming apparatus 2 may be a device for fixing a toner image or an ink jet type device.

The image forming apparatus 2 forms an image on a sheet using a developer such as toner. For example, the sheet is paper or label paper. The sheet may be any material as long as it is a material on which the image forming apparatus 2 can form an image on the surface thereof.

The display 210 is an image display device such as a liquid crystal display or an organic electro luminescence (EL) display. The display 210 displays various information items related to the image forming apparatus 2.

The control panel 220 includes a plurality of buttons. The control panel 220 receives an operation input of the user. The control panel 220 outputs a signal in accordance with the operation input of the user to a control unit of the image forming apparatus 2. The display 210 and the control panel 220 may be integrally configured as a touch panel.

The printer unit 230 forms an image on a sheet based on the image information generated by the image reading unit 250 or on the image information received via a communication channel. For example, the printer unit 230 forms an image using the following process. The image forming unit of the printer unit 230 forms an electrostatic latent image on a photosensitive drum based on the image forming information. The image forming unit of the printer unit 230 causes a developer to adhere to the electrostatic latent image to form a visible image. A specific example of the developer includes toner. A transfer unit of the printer unit 230 transfers the visible image to the sheet. A fixing unit of the printer unit 230 performs heating and pressurizing of the sheet to fix the visible image on the sheet. The sheet in which the image is formed may be a sheet stored in the sheet storage unit 240 or a manually supplied sheet.

The sheet storage unit 240 stores sheets to be used for image forming in the printer unit 230.

The image reading unit 250 reads image information based on the relative brightness and darkness thereof. The image reading unit 250 records the read image information. The read image information may be transmitted to other information processing apparatus via the network. The recorded image information may be imaged on the sheet by the printer unit 230.

Figure 3:
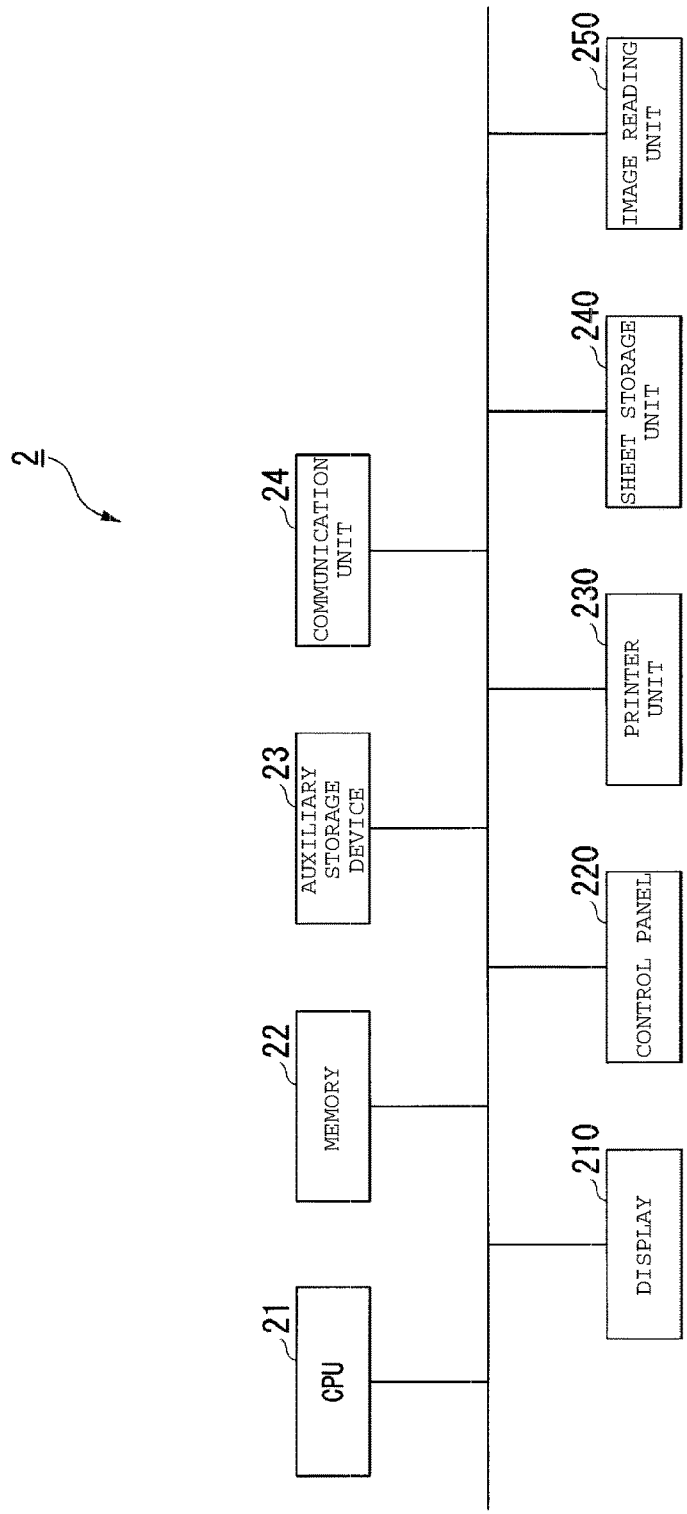
FIG. 3 is a functional block diagram showing a functional configuration according to the image forming apparatus.

FIG. 3 is a functional block diagram showing a functional configuration of the image forming apparatus 2. The image forming apparatus 2 is provided with a CPU 21 or a memory 22, an auxiliary storage device 23, and a communication unit 24 which are connected on a bus. For example, the image forming apparatus program is stored in the auxiliary storage device 23. The image forming apparatus 2 includes the display 210, the control panel 220, the printer unit 230, the sheet storage unit 240, and the image reading unit 250 by executing the image forming apparatus program. The entirety of, or a part of, respective functions of the image forming apparatus 2 may be implemented by software of an application specific integrated circuit (ASIC), a programmable logic device (PLD), or a field programmable gate array (FPGA). The image forming apparatus program may be recorded on a computer-readable recording medium. Examples of the computer-readable recording medium include a storage device such as a portable medium such as a flexible disk, a magnetic optical disc, a ROM, or a CD-ROM, or a hard disk included in the computer system. The image forming apparatus program may be transmitted via an electrical communications line.

The image forming apparatus 2 notifies the print server 3 of the status of the image apparatus 2. The image forming apparatus 2 transmits the status information to notify the print server 3 of the status of the image apparatus. For example, the image forming apparatus 2 notifies the print server 3 of its power status, the process status of a print job, or the like.

Figure 4:
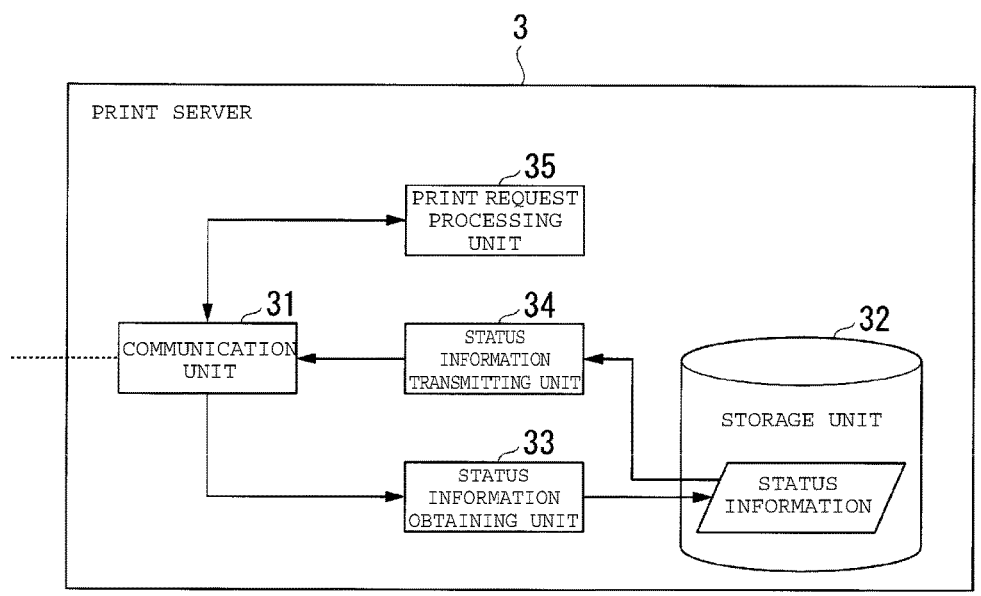
FIG. 4 is a functional block diagram showing a functional configuration of a print server.

FIG. 4 is a functional block diagram showing a functional configuration of a print server 3. The print server 3 includes a CPU, a memory, an auxiliary storage device, and the like which are connected by buses, and executes a print server program. The print server 3 serves as an apparatus including hardware elements such as a communication unit 31 and a storage unit 32, and a status information obtaining unit 33, a status information transmitting unit 34 and a print request processing unit 35, each of which represents the CPU of the printer server 3 executing different portions of the print server program. The entirety of, or a part of, the respective functions of the print server 3 may be implemented by software stored in or operable from an ASIC, a PLD, or a FPGA. The print server program may be recorded on a computer-readable recording medium. Examples of the computer-readable recording medium include a storage device such as a portable medium such as a flexible disk, a magnetic optical disc, a ROM, or a CD-ROM, or a hard disk included in the computer system. The print server program may be transmitted via an electrical communications line.

The communication unit 31 is a communication interface for connecting the print server 3 to the network 5.

The storage unit 32 includes a storage device such as a magnetic hard disk device or a semiconductor storage device. The storage unit 32 stores the status information obtained by the status information obtaining unit 33.

The status information obtaining unit 33 represents the CPU of the printer server 3 programmed to execute the following steps of the print server program. The status information obtaining unit 33 obtains the status information from the image forming apparatus 2. The status information obtaining unit 33 stores the obtained status information in the storage unit 32. The status information obtaining unit 33 continuously executes receiving the status information, obtaining status information at a predetermined timing. The status information obtaining unit 33 obtains the status information as a result of the notification of a status change from the image forming apparatus 2.

The status information transmitting unit 34 represents the CPU of the printer server 3 programmed to execute the following steps of the print server program. The status information transmitting unit 34 transmits the status information obtained from the image forming apparatus 2 to the user terminal 4. The status information transmitting unit 34 transmits the status information in response to a request from the user terminal 4. The status information transmitting unit 34 may transmit the status information according to the change in the status of the image forming apparatus 2 regardless of the presence or absence of a request from the user terminal 4.

The print request processing unit 35 represents the CPU of the printer server 3 programmed to execute the following steps of the print server program. The print request processing unit 35 processes a print request from the user terminal 4. Specifically, the print request processing unit 35 transmits the print data and the condition information transmitted from the user terminal 4 to the image forming apparatus 2 designated by the user. The print request processing unit 35 can use the function of the image forming apparatus 2 managed by the print server 3 by receiving the print request from other apparatuses on the network.

Figure 5:
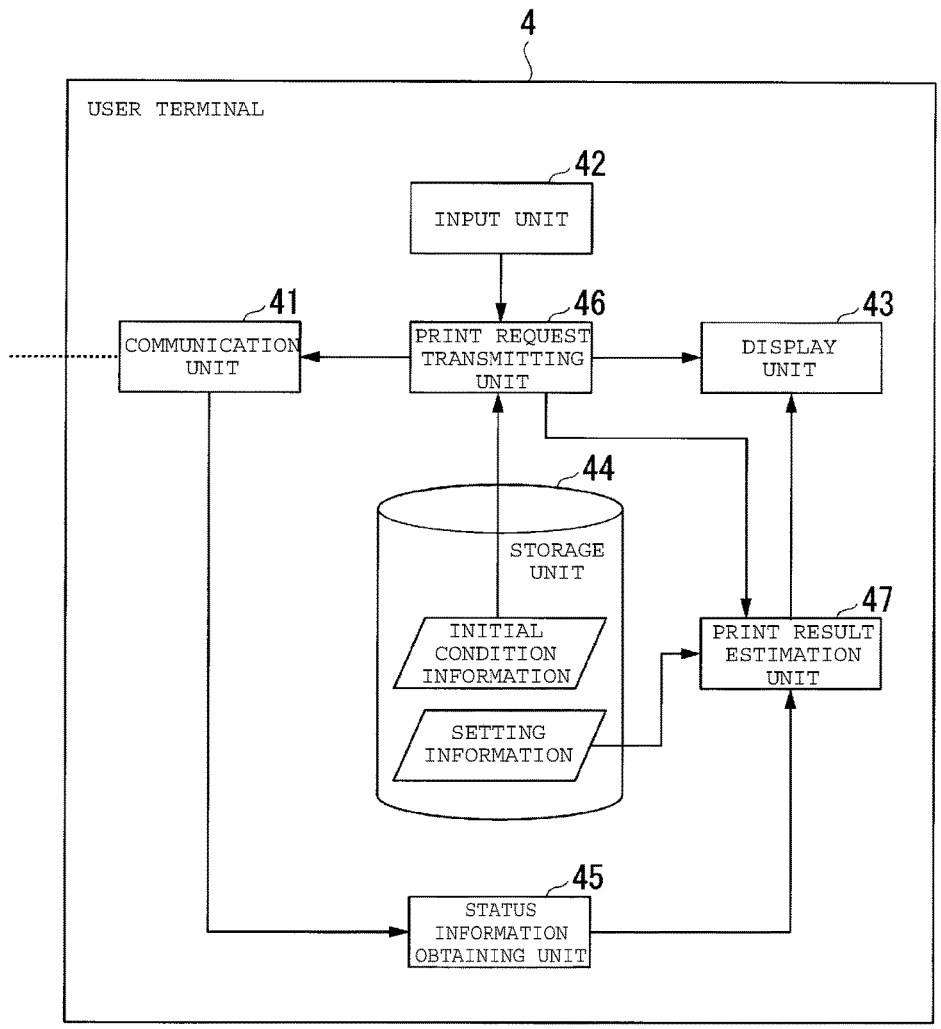
FIG. 5 is a functional block diagram showing a functional configuration of a user terminal.

FIG. 5 is a functional block diagram showing a functional configuration of a user terminal 4. The user terminal 4 includes a CPU, a memory, an auxiliary storage device, and the like which are connected by buses, and executes a user terminal program. The user terminal 4 serves as an apparatus including hardware elements such as a communication unit 41, an input unit 42, a display unit 43, and a storage unit 44, and a status information obtaining unit 45, a print request transmitting unit 46, and a print result estimation unit 47, each of which represents the CPU of the user terminal 4 executing different portions of the print server program. The entirety of, or a part of, the respective functions of the user terminal 4 may be implemented by a hardware such as an ASIC, a PLD, and a FPGA. The user terminal program may be recorded on a computer-readable recording medium. Examples of the computer-readable recording medium include a storage device such as a portable medium such as a flexible disk, a magnetic optical disc, a ROM, or a CD-ROM, or a hard disk equipped in the computer system. The user terminal program may be transmitted via an electrical communications line.

The communication unit 41 is a communication interface for connecting the user terminal 4 to the network 5. The type of communication which is performed by the communication unit 41 may be any one of a wireless communication and a wired communication.

The input unit 42 includes an input device such as a mouse, a key board, a touch panel, or the like. The input unit 42 may be an interface which connects the input devices to the apparatus. The input unit 42 receives an input of the print operation by the user of the user terminal 4 and outputs the input information of the user to the print request transmitting unit 46.

The display unit 43 includes a display device such as a cathode ray tube (CRT) display, a liquid crystal display, or an organic electro-luminescence (EL) display. The display unit 43 has an interface which connects to the display device. The display unit 43 displays the print condition set by the user or the print result estimated by the print result estimation unit 47.

FIG. 6 is a view showing a specific example of a state wherein print conditions and print results are displayed on the display unit 43. For example, the print condition and the print result are displayed on a setting screen 100 for setting of the print conditions by the user. The setting screen 100 has a printing condition setting area 110 and a printing result display area 120. In the printing condition setting area 110, the print condition is displayed. For example, in the printing condition setting area 110 in the initial state, initial values of the print conditions pre-registered or saved in the user terminal 4 are displayed. The print condition displayed on the printing condition setting area 110 can be changed by the user. The display of the print condition in the printing condition setting area 110 is updated according to changes made by the user.

In the printing result display area 120, the print result estimated by the print result estimation unit 47 is displayed. For example, in the embodiment, a print cost, a print time, and a degree of environmental influence, which are shown in the example in FIG. 7, are displayed as a print result. The print cost is required to execute the printing process. The print time is the necessary time required to execute the printing process. The degree of the environmental influence is an index value indicating the degree of the influence with respect to the environment caused by executing the printing process.

FIG. 7 is a view showing an example of information to be used for estimating the print result. The item of the type of the print result indicates the type of the estimated print result, and each item of corresponding elements indicate the type of the information items used for estimating the print result. Here, as an example of the corresponding elements, a designation of a printing color, a designation of a printing surface, a designation of an aggregate printing, a designation of the number of copies, a designation of hole punching, a designation of stapling, a designation of a sheet discharging destination, a designation of a sheet type, power consumption, a printing speed, and a status of the image forming apparatus are listed. The user terminal 4 can obtain the information items of the corresponding elements as condition information, setting information, and status information.

The setting information is used for estimating the print result by the print result estimation unit 47. Specifically, the setting information relates to designs or performances of the image forming apparatus 2 that differ for each model of the apparatus. For example, among the corresponding elements, information items such as a printing speed or power consumption are included in the setting information. The setting information is registered in the user terminal 4 in advance.

For example, among the corresponding elements, the designation of a printing color, the designation of a printing surface, the designation of aggregate printing, the designation of the number of copies, the designation of hole punching, the designation of stapling, the designation of a sheet discharging destination, the designation of a sheet type, and the like are included in the condition information.

For example, among the corresponding elements, the status of an image forming apparatus can be obtained as status information to be transmitted by each image forming apparatus 2 to the print server 3.

FIG. 7 illustrates how the obtainable information of the corresponding element effects the estimation of the print result. For example, the designation of a printing color, the designation of a printing surface, the designation of aggregate printing, and the designation of the number of copies mainly effect to the print cost. In addition, the designation of a printing color, the designation of a printing surface, the designation of aggregate printing, the designation of the number of copies, the designation of hole punching, the designation of stapling, the designation of a sheet discharging destination, the designation of a sheet type, the print speed, and the status of the image forming apparatus mainly effect the print time. In addition, the designation of a printing color, the designation of a printing surface, the designation of aggregate printing, the designation of the number of copies, the designation of a sheet type, and the power consumption mainly affect the degree of environmental influence. The print result estimation unit 47 estimates the execution result of the printing process based on the information of the corresponding elements.

The relationship between the print result type and the corresponding elements shown in FIG. 7 is an example thereof. How the execution result of the printing process is affected by the corresponding elements may be determined using different criteria than those in FIG. 7. In addition, when information is obtainable as the condition information, the setting information, and the status information, the corresponding element may be any information relating to the printing process. A method for estimating various execution results from the information of the corresponding elements may be any method in addition to a specific example described herein.

Description of FIG. 6 will now be continued. The storage unit 44 includes a storage device such as a magnetic hard disk device, a semiconductor storage device, or the like. The storage unit 44 stores initial condition information and setting information in advance. The initial condition information indicates an initial value of the print condition.

The status information obtaining unit 45 represents the CPU of the user terminal 4 programmed to execute the following steps of the print server program. The status information obtaining unit 45 (status obtaining unit) obtains the status information of the image forming apparatus 2 from the print server 3. The status information obtaining unit 45 may obtain the status information directly from the image forming apparatus 2 without getting it via the print server 3. The status information obtaining unit 45 outputs the obtained status information to the print result estimation unit 47. The status information obtaining unit 45 continuously executes an obtaining the status information loop or request at a predetermined timing. For example, the status information obtaining unit 45 may periodically obtain the status information at a predetermined period.

The print request transmitting unit 46 represents the CPU of the user terminal 4 programmed to execute the following steps of the print server program. The print request transmitting unit 46 (print condition obtaining unit) requires the execution of the printing process with respect to the image forming apparatus 2 or the print server 3 according to the operation of the user. Specifically, the print request transmitting unit 46 causes the print condition setting screen to be displayed on the display unit 43. The print request transmitting unit 46 displays the print condition set by the user on the display unit 43, and outputs the condition information to the print result estimation unit 47 according to changes in the print condition. The print request transmitting unit 46 transmits print data designated by the user and the condition information indicating the print condition set by the user, according to the input of the execution instruction for the print. For example, the above described function of the print request transmitting unit 46 is implemented by executing the print program.

The print result estimation unit 47 represents the CPU of the user terminal 4 programmed to execute the following steps of the print server program. The print result estimation unit 47 estimates the execution result of the printing process using the conditions indicated by condition information, based on the condition information and the status information. The print result estimation unit 47 displays the estimated print result on the display unit 43. The print result estimation unit 47 executes estimating of the print result according to the change in the status of the print condition or the image forming apparatus 2.

Figure 8:
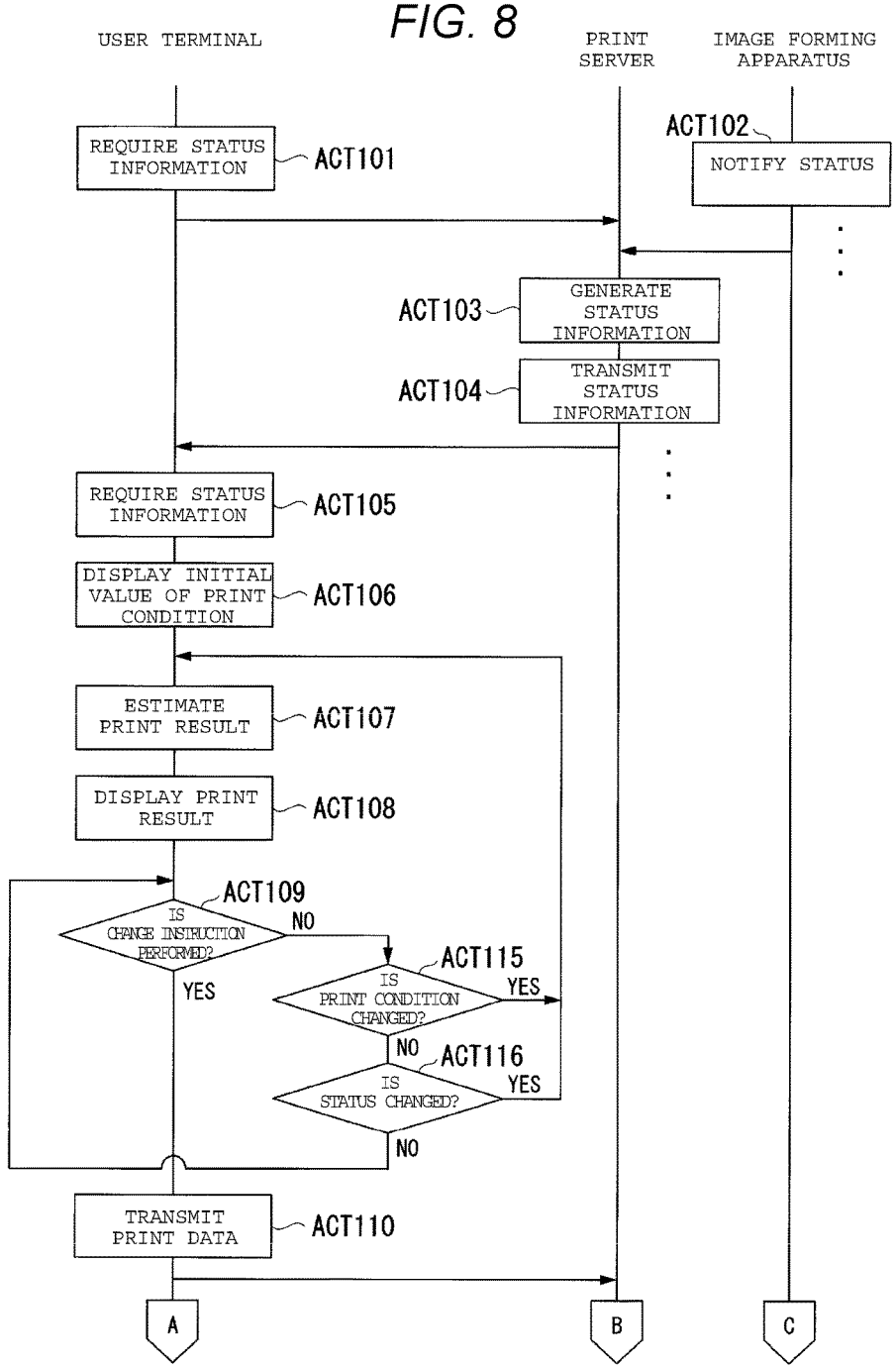
FIG. 8 is a sequence diagram illustrating a flow of a printing process in the printing system according to the embodiment.
Figure 9:
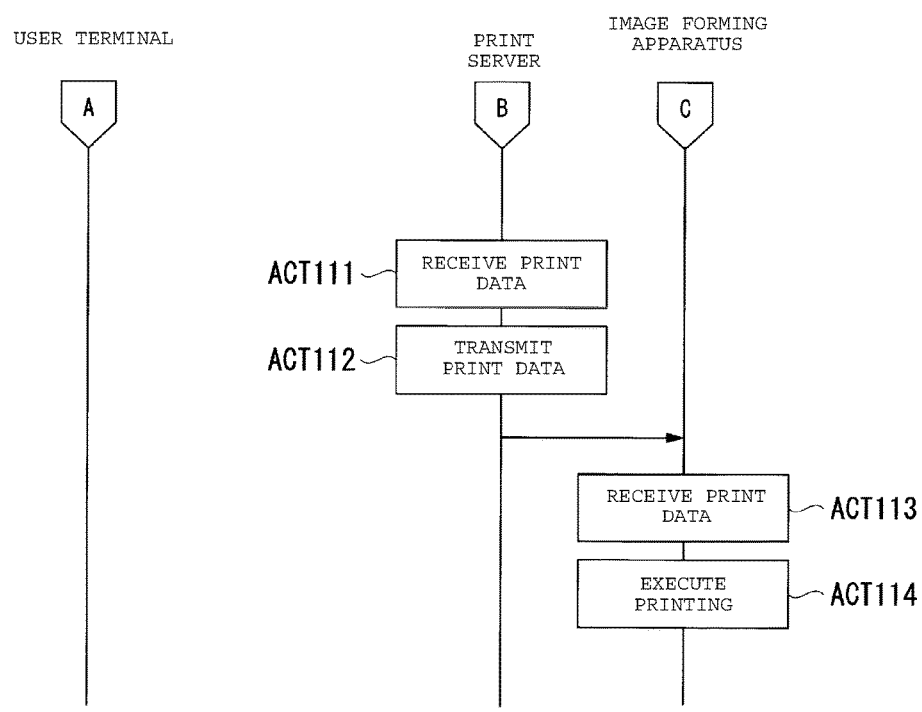
FIG. 9 is a sequence diagram illustrating a flow of a printing process in the printing system according to the embodiment.

FIGS. 8 and 9 are sequence diagrams illustrating a flow of a printing process in the printing system 1 according to the embodiment. First, the user operates the user terminal to display the setting screen. The print request transmitting unit 46 of the user terminal 4 executes a print program to display the setting screen on the display unit 43. The status information obtaining unit 45 of the user terminal 4 requires the print server 3 for the status information according to the display of the setting screen according to the display of the setting screen (ACT 101).

The print server 3 transmits the status information when required by the user terminal 4. For example, the status information may be generated as follows. The image forming apparatus 2 continuously notifies the print server 3 of its status at a predetermined timing (ACT 102). The status information obtaining unit 33 of the print server 3 generates the status information indicating the status of the image forming apparatus 2 which is managed by the image forming apparatus 2 based on the status notified from the image forming apparatus 2 (ACT 103). The status information obtaining unit 33 stores the generated status information in the storage unit 32. The status information transmitting unit 34 transmits the status information which is generated by the status information obtaining unit 33 when required by the user terminal 4 (ACT 104).

Thereafter, the status information transmission processes of ACT 101 to ACT 104 are continuously executed at a predetermined timing. Through the status information transmission processes, the user terminal 4 can successively obtain the status of the image forming apparatus 2. The above-described status information transmission process is executed according to the request of the user terminal 4. When the user terminal 4 is capable of obtaining the status information successively, the status information transmission process may be implemented by other methods. For example, generating and transmitting of the status information may be executed by the image forming apparatus 2 instead of at the request of the user terminal 4. The user terminal 4 receives the status information which is transmitted from the print server 3 (ACT 105). The status information obtaining unit 45 outputs the received status information to the print result estimation unit 47.

On the other hand, the print request transmitting unit of the user terminal 4 reads the initial condition information from the storage unit 44 according to the display of the setting screen. The print request transmitting unit 46 displays the initial value of the print condition indicated by the initial condition information on the setting screen (ACT 106).

Subsequently, the print result estimation unit 47 estimates the print result based on the condition information and the status information (ACT 107). Hereinafter, the estimation which is initially performed after displaying the setting screen referred to as an initial estimation. In the initial estimation, the print result estimation unit 47 estimates the print result based on the initial value of the print condition and latest status information which is obtained at this point of time. The print result estimation unit 47 displays the estimated print result on the setting screen (ACT 108). After displaying the print result in the initial estimation, the user terminal 4 receives an input of a print condition change or a print execution operation.

The print request transmitting unit 46 determines whether or not the input of the print execution instruction is received (ACT 109). When the input of the print execution instruction is received (ACT 109—YES), the print request transmitting unit 46 generates the print data and transmits the generated print data to the print server 3 (ACT 110). The print data includes condition information indicating the print conditions set in the image forming apparatus 2 selected by the user, and data to be printed. The print server 3 receives the print data transmitted from the user terminal 4 (ACT 111). The print server 3 transmits the received print data to the image forming apparatus 2 which is selected by the user (ACT 112). The image forming apparatus 2 receives the print data transmitted from the print server 3 (ACT 113). The image forming apparatus 2 executes the printing process based on the received print data (ACT 114).

On the other hand, when the input of the print execution instruction is not received in ACT 109 (ACT 109—NO), the print request transmitting unit 46 determines whether or not the print condition is changed (ACT 115). When the print condition is not changed (ACT 115—NO), the print request transmitting unit 46 determines whether or not the status of the image forming apparatus 2 is changed (ACT 116). When the status of the image forming apparatus 2 is not changed (ACT 116—NO), the process returns to ACT 109, the print request transmitting unit 46 repeatedly performs the determination whether or not the input of the print execution instruction is received.

On the other hand, when the print condition is changed (ACT 111—YES) or when the status of the image forming apparatus 2 is changed (ACT 111—YES), the process returns to ACT 107. The print result estimation unit 47 estimates the print result based on the status of the image forming apparatus 2 at the point of time and the print condition after changing.

Hereinafter, the specific example of the estimation of a print result will be described as an example of the correspondence relationships in FIG. 6. For example, when estimating the print cost, in the user terminal 4, the following information items are stored in advance as setting information. One is information indicating the correspondence between the print color and the print unit price. The other is information indicating the correspondence between a print sheet type and an additional cost. The print result estimation unit 47 calculates the number of print sheets required based on the setting of a print surface, the setting of aggregate printing (e.g., as in printing multiple pages of a document on a single sheet, sometimes referred to as N-in-1 printing or N-up printing), and the number of copies. The print result estimation unit 47 calculates the print cost based on the calculated number of print sheets, a print unit price in accordance with the print color, and the additional cost in accordance with the print sheet type.

Next, a specific example of the estimation of the print time will be descried. In this case, in the user terminal 4, the information is stored in advance as setting information. One is information indicating the time needed for printing one sheet. The other is information indicating the correspondence between a standby status of the image forming apparatus 2 and a delay time which is required time from the standby time until the time when the printing process starts. In general, the image forming apparatus 2 has a function for switching the status of the apparatus to various standby statuses according to the process state of the print job for the purpose of reducing power consumption. Accordingly, when the print job is generated in a standby status time period, time for recovering from the standby status before starting of the printing process is required. One of the other information items stored in the setting information indicates a time required for hole punching and stapling (hereinafter, referred to as an "additional process").

In this case, the print result estimation unit 47 calculates the number of print sheets required for printing, using the predetermined conditions in the same manner as that done in the print cost estimation. The print result estimation unit 47 determines the standby status of the image forming apparatus 2 based on the status information obtained from the print server 3. The print result estimation unit 47 calculates the print time based on the calculated number of print sheets, the necessary time for printing one sheet, the recovery time to start printing from the standby status, and the time required for any additional process. In calculating the print time, the standby time before executing the printing process may be calculated according to the process state of the print job.

Next, a specific example of the estimation of the degree of environmental influence will be described. In this case, in the user terminal 4, the following information items are stored in advance as setting information. One is information indicating power consumption of the image forming apparatus 2 required for printing one sheet. The other is information indicating relative weights to be applied to each element which correspond to the degree of the environmental influence thereof. For example, a small relative weight can be applied for each type of print sheets which can be recycled, and a large relative weight can be applied for each type of print sheet which are not easy to recycle. Additionally for example, the large relative weight may be applied to a color print which requires a plurality of toners, and the small relative weight may be applied to monochrome printing.

In this case, the print result estimation unit 47 calculates the number of print sheets required for printing under the designated conditions in the same manner as that used in the print cost estimation. The print result estimation unit 47 calculates the degree of the environmental influence based on the calculated number of the print sheets, the value of each corresponding element, and the relative weight of each corresponding element. For example, the print result estimation unit 47 may calculate the degree of environmental influence by multiplying the calculated number of print sheets with the relative weights of the values of each corresponding element.

The user terminal 4 according to the embodiment thus configured estimates the execution result of the printing process according to any change in the print condition and any change in the status of the image forming apparatus 2. Therefore, on at least one of the user terminals 4 of the embodiment described above, the print result in accordance with changes in the print condition or in the status of the image forming apparatus can be provided to the user.

Hereinafter, a modification example of the printing system 1 according to the embodiment will be described.

The user terminal 4 may include a print condition estimation unit which estimates the printing condition required for obtaining the execution result which is designated with respect to the printing process. In this case, for example, the user inputs the value of an allowable print result with respect to the estimation value of the print result displayed on the setting screen. The print condition estimation unit estimates the allowable print condition that can be designated by the user by which the print result can be obtained, and presents the estimated result to the user. For example, when the print condition is selected uniquely from the print result, the print condition estimation unit may estimate the print condition through a simple back calculation. For example, when a plurality of print conditions are obtained from the print result, the print condition may be estimated by solving an optimization problem using a predetermined evaluation standard by the print condition estimation unit.

The image forming apparatus 2 or the print server 3 may include the estimation function of the print result instead of the user terminal 4. For example, in this case, the image forming apparatus 2 or the print server 3 includes the storage unit 44, the status information obtaining unit 45, and the print result estimation unit 47, and stores the setting information. The print request transmitting unit 46 of the user terminal 4 transmits the condition information according to any change in the print condition to the image forming apparatus 2 or the print server 3. The image forming apparatus 2 or the print server 3 estimates the print result using the conditions indicated by the received condition information transmitted from the user terminal 4. The image forming apparatus 2 or the print server 3 transmits the estimated print result to the user terminal 4. The user terminal 4 updates the display of the setting screen by the received print result.

The functions of the image forming apparatus 2, the print server 3, and the user terminal 4 according to the above-described embodiment may be implemented by a computer. In this case, the functions may be implemented by a program for implementing the functions in such a manner that the program is recorded on a computer-readable recording medium from which a computer system can read, the computer system reads the program from the recording medium, and executes the program. The term "computer system" as used herein is a system which includes an OS and hardware resources such as peripheral devices. In addition, the "computer-readable recording medium" indicates such as a storage device such as a portable medium such as a flexible disk, a magnetic optical disc, a ROM, or a CD-ROM, or a hard disk equipped in the computer system. The "computer-readable recording medium" may include a communication line that holds dynamically temporarily the program. The communication line transmits the program via a communication channel such as a network like the Internet or a telephone line. The "computer readable recording medium" may also include a volatile memory in the computer system that is a server or a client and stores the program for a predetermined period of time. The program may implement part of the above-described function. The part of the above-described function may be used in combination with a program previously recorded on the computer system.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A printing result estimation apparatus comprising:
   a print condition obtaining unit configured to obtain condition information indicating a selected print condition set by a user;
   a status obtaining unit configured to periodically obtain status information of an image forming apparatus;
   a print result estimation unit configured to estimate an execution result of a printing process based on the condition information and the status information when a status of the image forming apparatus is determined to have changed based on the periodically obtained status information, wherein the estimated execution result includes an effect of printing on cost factors, environmental factors, and a time required to execute printing;
   a print condition estimation unit configured to obtain a selected print result set by the user and estimate an allowable print condition required for obtaining the selected print result, the selected print result including at least one of an allowable cost of printing, an allowable environmental impact of printing, and a time allowed to execute printing; and
   a display device controlled to display a print result estimate of the print result estimation unit and to display the allowable print condition estimated by the print condition estimation unit.

2. The apparatus of claim 1, wherein the print condition obtaining unit is configured to cause a print condition setting screen to be displayed on the display device, the print condition being set by the user via the print condition setting screen.

3. The apparatus of claim 1, wherein the print result estimation unit is configured to control the display device to display the estimated print result.

4. The apparatus according to claim 1, wherein the cost factors include a monetary cost required for executing the printing.

5. The apparatus according to claim 1, wherein the environmental factors include the power consumption required for executing the printing process.

6. The apparatus according to claim 1, wherein the execution result of the printing process to be estimated by the print result estimation unit includes an index value of an environmental influence caused by the execution of the printing process.

7. The apparatus according to claim 1, wherein:
   the status information includes information indicating whether the image forming apparatus is in a standby state, and
   the time required to execute printing is estimated based at least in part on the information indicating whether the image forming apparatus is in the standby state.

8. The apparatus according to claim 1, further comprising:
   a storage unit that stores an initial print condition, wherein the print result estimation unit is configured to:
   estimate a first execution result of the printing process based on the initial print condition and the status information, and
   estimate a second execution result of the printing process based on the selected print condition, and
   the print result estimate displayed by the display device includes information indicating the first execution result and the second execution result.

* * * * *